United States Patent
Orpaz et al.

(10) Patent No.: US 6,937,755 B2
(45) Date of Patent: Aug. 30, 2005

(54) MAKE-UP AND FASHION ACCESSORY DISPLAY AND MARKETING SYSTEM AND METHOD

(76) Inventors: Rami Orpaz, P.O. Box 94, Shari-Tikva, 44810 (IL); Ruth Gal, 6 Avshalom Haviv Street, Tel-Aviv 69495 (IL)

(*) Notice: Subject to any disclaimer, the term of this patent is extended or adjusted under 35 U.S.C. 154(b) by 582 days.

(21) Appl. No.: 09/893,221

(22) Filed: Jun. 27, 2001

(65) Prior Publication Data

US 2002/0071604 A1 Jun. 13, 2002

Related U.S. Application Data

(60) Provisional application No. 60/214,494, filed on Jun. 27, 2000.

(51) Int. Cl.$^7$ .......................... G06K 9/00; G09B 19/00
(52) U.S. Cl. ...................... 382/162; 382/167; 382/274; 345/592; 434/100
(58) Field of Search ................................ 382/100, 118, 382/162, 167, 190, 203, 274, 286, 289, 296, 298; 345/589, 592, 629–640; 355/79, 80; 434/81, 98–100

(56) References Cited

U.S. PATENT DOCUMENTS

| | | | |
|---|---|---|---|
| 4,539,585 A | | 9/1985 | Spackova et al. |
| 5,478,238 A | | 12/1995 | Gourtou et al. |
| 5,495,338 A | | 2/1996 | Gouriou et al. |
| 5,515,268 A | | 5/1996 | Yoda |
| 5,622,692 A | | 4/1997 | Rigg et al. |
| 5,751,829 A | | 5/1998 | Ringland et al. |
| 5,831,604 A | * | 11/1998 | Gerber .......................... 345/601 |
| 5,838,194 A | * | 11/1998 | Khoury ........................ 330/139 |
| 5,990,901 A | * | 11/1999 | Lawton et al. ............... 345/581 |
| 6,023,302 A | * | 2/2000 | MacInnis et al. ........... 348/597 |
| 6,453,052 B1 | * | 9/2002 | Kurokawa et al. .......... 382/100 |
| 6,661,906 B1 | * | 12/2003 | Kawade et al. ............. 382/118 |
| 6,714,660 B1 | * | 3/2004 | Ohba ......................... 382/103 |

FOREIGN PATENT DOCUMENTS

| | | |
|---|---|---|
| EP | 0 226 959 A2 | 7/1987 |
| EP | 1 030 267 A1 | 8/2000 |
| WO | WO 98/58351 | 12/1998 |
| WO | WO 99/23609 | 5/1999 |

* cited by examiner

*Primary Examiner*—Bhavesh M. Mehta
*Assistant Examiner*—Yubin Hung
(74) *Attorney, Agent, or Firm*—Schweitzer Corman Gross & Bondell LLP

(57) ABSTRACT

A method for simulating an appearance of make-up and fashion accessories on an image of a consumer and for marketing such products includes compiling a database of a plurality of products having appearance information for each product, acquiring a base image of a consumer having a plurality of pixels, identifying a product application area in the base image having a blending region, whree the product application area and blending region thereof being are by sets of pixels of said base image, receiving a product selection from a consumer, retrieving appearance information associated with a selected product from the database, modifying the appearance information of the product application area according to the appearance information of the selected product, blending the blending region with the base image by modifying appearance information of pixels of the blending region according to appearance information of the selected product and according to appearance information of associated pixels of the base image in the blending region, displaying a composite image of the base image as modified and blended in the application area and the blending region thereof, and providing means to display an alternative product within the product application area.

7 Claims, 25 Drawing Sheets

FIG. 4
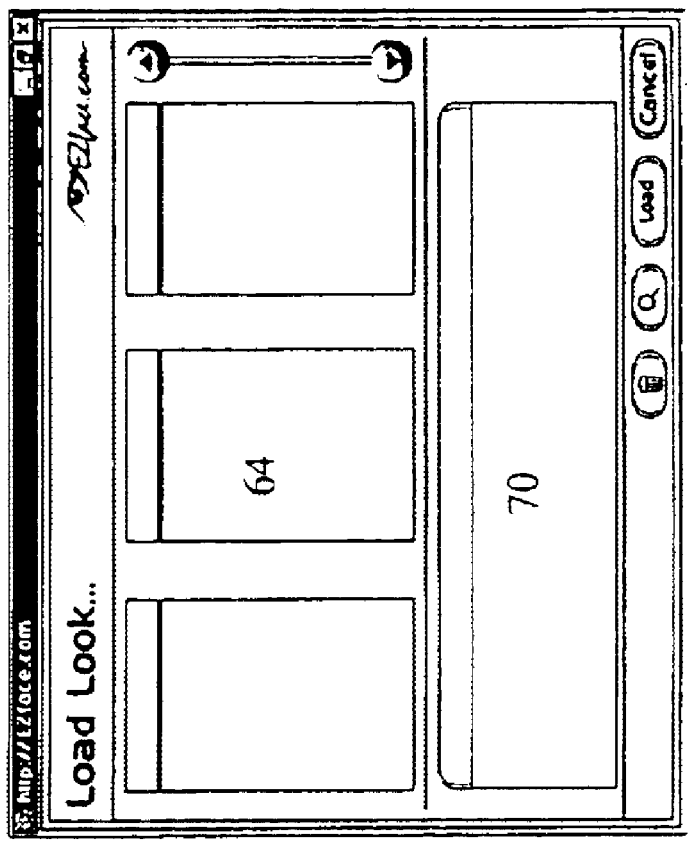
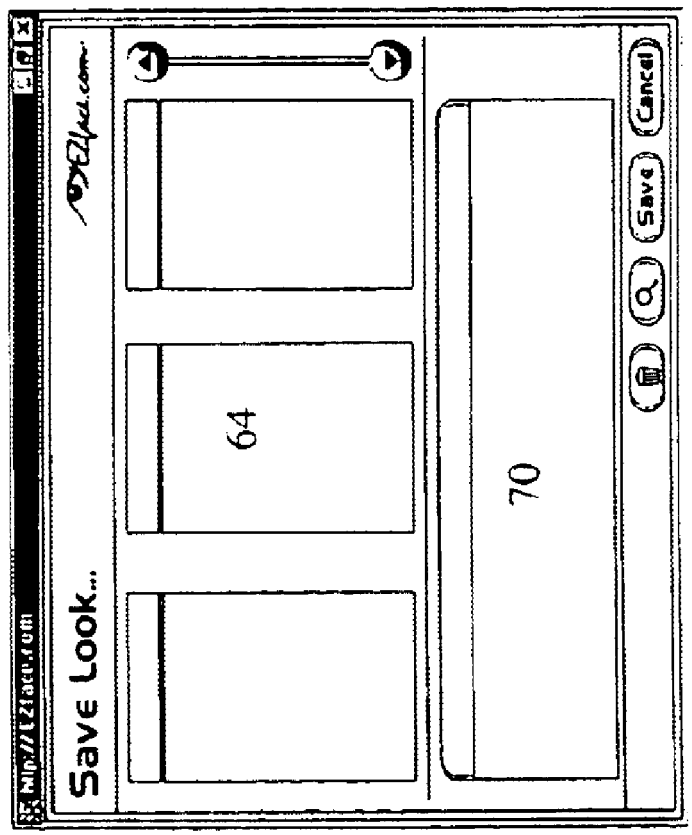

FIG. 14
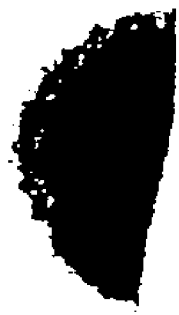

FIG. 15
 

FIG. 17
 

FIG. 18

MAKE-UP AND FASHION ACCESSORY DISPLAY AND MARKETING SYSTEM AND METHOD

This application claims the priority of Provision Application Ser. No. 60/214,494 filed Jun. 27, 2000.

FIELD OF THE INVENTION

The invention pertains to the field of display systems and methods for simulating the appearance of make-up and fashion accessories, and pertains to a method for marketing make-up and fashion accessories.

BACKGROUND AND SUMMARY OF THE INVENTION

Consumers of make-up and fashion accessory products, especially "high-end" make-up and fashion accessory products, usually need to see how such products will appear on themselves prior to making a purchase decision. Because of this, make-up and fashion accessory merchants have had a need to rely substantially on physical store locations where consumers can try different make-up applications and accessories.

Some merchants have attempted to use digital computer imaging technology to provide a simulation of make-up products, however, these past systems merely display various types of make-up on models and do not show how such make-up would appear on the consumer. Moreover, these past systems use fixed photographs and do not provide means to select various combinations of products. Further, the past systems do not provide means to adjust the amount of make-up products applied.

Therefore, what is desired is a system and method for life-like simulation of the appearance of make-up and fashion accessories on an image of a consumer, which allows the consumer to simulate various combinations of products and allows the consumer to simulate various application amounts of make-up products. Further, what is desired is a method of using an image of a consumer as a vehicle for marketing make-up products and fashion accessories.

The present invention provides a system and method in which make-up and accessory products precisely overlie and smoothly blend with a digital image of a consumer (e.g., an image of the consumer's face, or head and torso) to create a true-to-life simulation of how such products will appear on the consumer. Further, the system and method allows the consumer to choose from a large plurality of products, to create a multiplicity of combinations of image simulations, as desired by the consumer. Further, the system and method allow the user to modify the image to simulate applications of various amounts of make-up products, as preferred by the consumer. In addition, the invention provides a method for marketing make-up products and fashion accessories to a targeted consumer using a digital image of the consumer, where products precisely overlie and smoothly blend with the digital image, to create a compelling and effective marketing vehicle.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 4 is a screen shot of a retrieval interface of the system for loading stored looks;

FIG. 12-18 are gray-scale images representing alpha channel values of several make-up application areas of the base image;

The file of this patent contains at least one drawing executed in color. Copies of this patent, with color drawings, will be provided by the Patent and Trademark Office upon request and payment of the necessary fee.

DETAILED DESCRIPTION OF THE INVENTION

Figure 1:
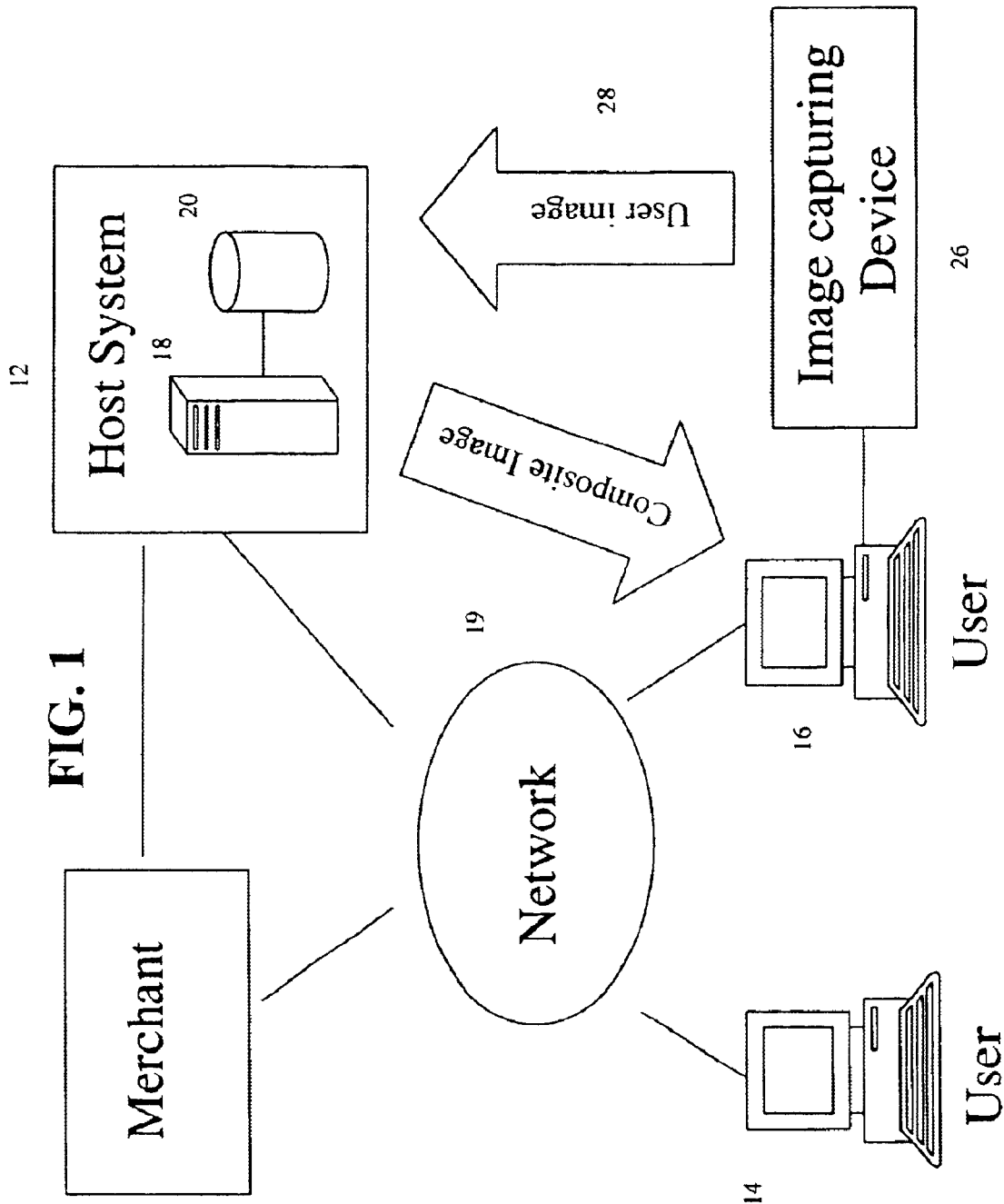
FIG. 1 is a schematic overview of the components of a system according to the invention.

Referring to FIG. 1, the method and system of the present invention provides a means for consumers to "try and buy" make-up products and accessories, from virtually any computer in virtually any location. The components of the system 10 include a host system 12 and a plurality of user systems 14, 16 interconnected by a computer network 19. Preferably, the components of the system 10 are interconnected by the Internet such that the user systems 14, 16 can be located anywhere in the world with access to the Internet.

The host system 12 includes a host computer 18, which can comprise one or more computers, and a database 20. The user systems 14, 16 each include a graphic monitor 22 and a central processing unit 24, which can be of any suitable type. The user systems 14, 16 can be "thin" clients, with minimal resources, or can have substantial resources including a data storage device, such as a hard drive.

As depicted, the components of the system 10 can be distributed over a wide geographical area. However, it can be appreciated that some or all of the components can be included in one enclosure. For example, it is contemplated that all of the components of the system can be enclosed within one "kiosk", which could be located within a retail store.

The system uses a digital base image of the head and face of the user to demonstrate how make-up and accessory products will appear on the user. This base image can be considered a blank canvas of the user and can be acquired using an image capturing device 26 connected to the user system 14, 16 or can be acquired by digitally scanning a photograph 28 sent to the host 12 by the user. Other methods of acquiring the digital base image are also suitable.

The database 20 includes product information for various types of make-up products and fashion accessories, including appearance information to be used in simulating the appearance of the products on the base image of the user. The method requires only a very "thin" amount of data content to be stored in the database for each product—a product's color is represented by a 3 byte RGB value, which is enough for the blending engine of the system to produce the photo-realistic look. Two major advantages of this method include the ability to transfer product information quickly over a very narrow-bandwidth communication line (i.e., low transmission overhead) and the compatibility of the product information with many types of user systems The client application is built around a color blending and a display software engine. The client application has a protocol for querying the database and getting product colors and details, and accessories images. It also has a user interface through which the user controls the application of colors and accessories to the user's image. These functional controls can be hooked to any suitable menu system, keyboard, remote control or graphic user interface. The description below describes the system as implemented via the Internet graphic global computer network. However, it can be appreciated that other implementations are within the scope of the invention.

The System User Interfaces

Figure 2:
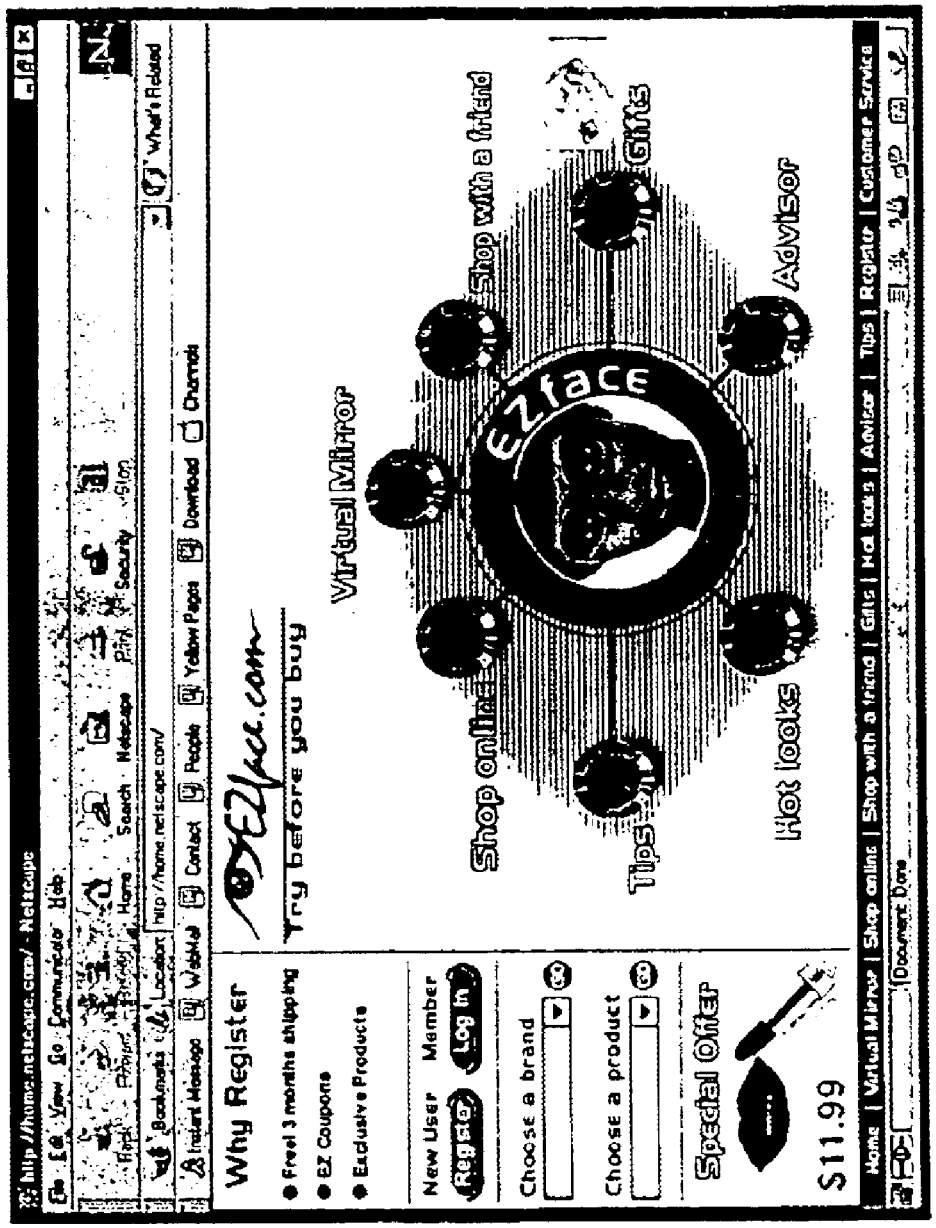
FIG. 2 is a screen shot of an initial interface of the system.

FIG. 2 displays an initial graphic user interface 30 of the system, suitable for access over the Internet through a standard browser. The initial interface 30 includes means for new users to register with the host system 12 and means for registered users to login (using a unique user-name and password combination).

Figure 3:
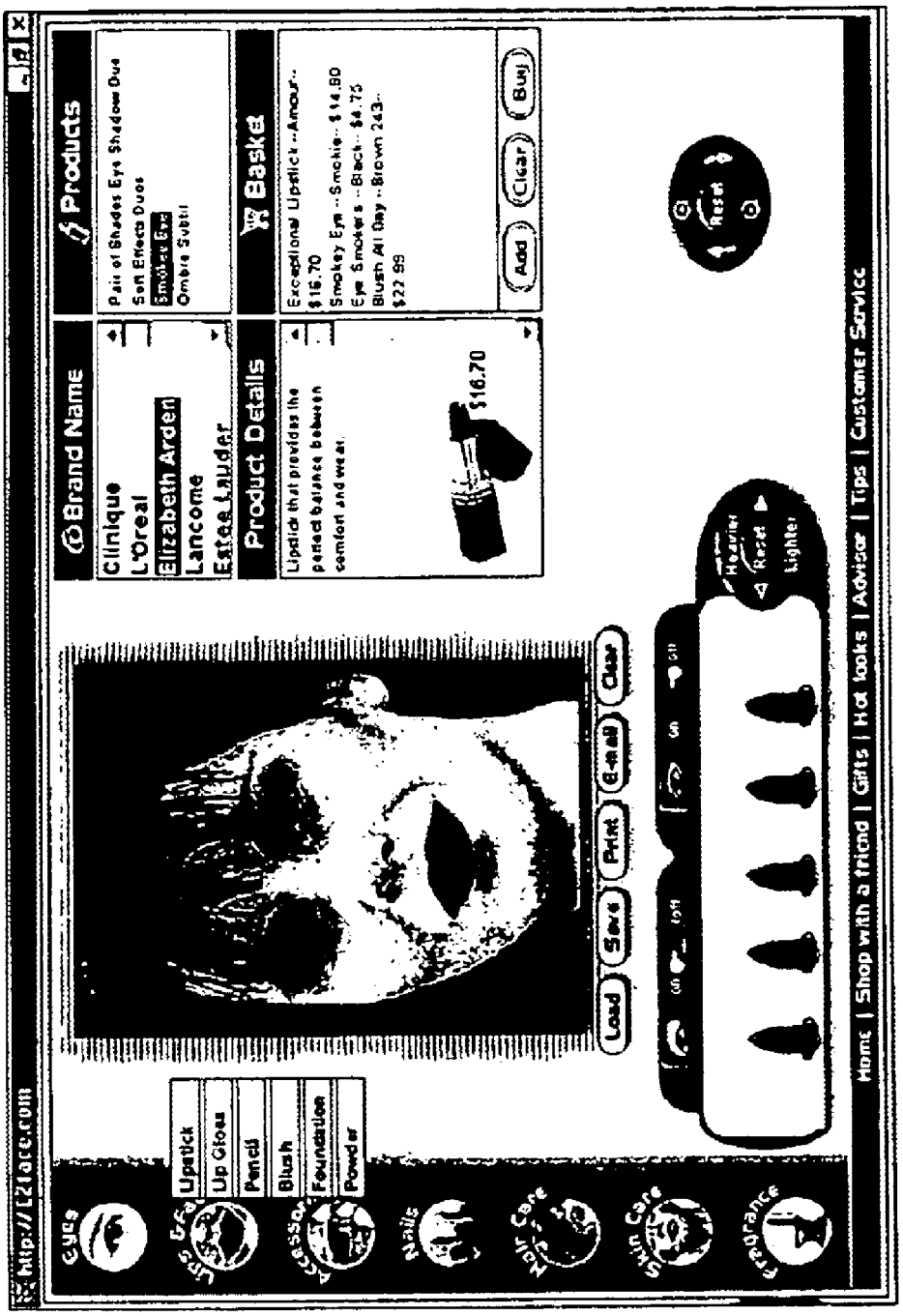
FIG. 3 is a screen shot of an image simulation interface of the system.

Referring to FIG. 3, an image simulation graphic interface (ISI) 33, for the internet, accessible through a standard Internet browser, provides a single interface through which users can "try and buy" cosmetic make-up products and fashion accessories, and other related products. The ISI 33 includes the user's base image 02, a category list 32, and a subcategory list 34.

The categories in the category list 32 can include eyes, lips & face, accessories, nails, hair, and other categories of related items. The subcategory list 34 is dependent upon the category chosen (i.e., highlighted or clicked upon). As shown, if the lips & face category is chosen, the subcategory list 34 can include: lipstick, lip-gloss, lip pencil, blush, foundation, power, and others. Subcategories for the lips category can include: eye shadow, eyeliner, mascara, eye pencil, etc. Subcategories for accessories can include: eye wear, earrings, necklaces, pendant, and the like. The subcategories for nails can include various types of nail polish. Similarly, the subcategories for hair care can include various hair dies and highlights, and the like.

The ISI 33 also includes a brand name list 38, which is retrieved from the database 20 and which is preferably dependent upon the category and subcategory chosen by the user. The ISI 33 also includes a products list 36, which is preferably dependent upon the category, subcategory and brand name chosen by the user.

The ISI 33 also includes a color selection interface (CSI) 44, which displays color options available for the chosen product. Preferably the CSI 44 displays relatively enlarged graphic images of the products to clearly indicate the various color options. The user can chose a color by highlighting or clicking upon one of the colors displayed in the CSI 44. Upon such a selection, the system 10 displays the chosen product on the base image 02 of the user in the ISI 33 in a method described in detail below. When a color is chosen from the CSI 44, the system 10 also preferably displays a full image of the product and its packaging in a product details section 40 of the ISI 33, along with descriptive and price information.

Figure 6:
FIG. 6 is a color image of a base image of a consumer.

Referring to FIG. 6, the base image 02 of the consumer is preferably an image of the consumer without any make-up (or with only base make-up); thereby forming the "blank canvas" upon which make-up products will be applied, with the digital blending technologies of the invention.

Figure 7:
FIG. 7-11 are color composite images showing make-up applied to various make-up application areas of the base image.
Figure 8:
Figure 9:
Figure 10:

FIGS. 7–10 display how the base image is altered by the system when make-up products are applied to various portions of a base image. Specifically, FIG. 7 shows red blush applied to the cheeks on the base image; FIG. 8 shows blue eye liner applied to the upper eye lid on the base image; FIG. 9 shows red lipstick applied to the lips on the base image; and FIG. 10 shows purple eye shadow applied to the upper eye lid on the base image.

The ISI 33 also includes application controls 45 to adjust the "amount" of the make-up product applied to the base image 02. Specifically, the application controls 45 include means to increase the amount of make-up (i.e., "heavier"), to decrease the amount of make-up ("lighter") and to reset the application amount to an initial, or default amount ("reset").

Figure 11:

FIG. 11 is an image of a significantly reduced amount of eye shadow applied to the base image as compared to that of FIG. 10.

The ISI 33 also includes a save function 54 which directs the system 10 to save information regarding the current state of the image in the ISI 33, including the products currently applied to the image and any variations in the application of the products directed by the user through the application controls 44. For purposes herein, such information will be collectively called a "look."

The look information is preferably recorded in a predetermined format, either on the user's system 14, 16 or on the host 12, or both. Preferably, the look file also contains a look image file representing the base image with the products identified in the look file applied thereto. The look image can be of a reduce size and/or resolution. The system 10 is able to use the product information contained in a look file with any base image of any user.

Referring to FIG. 4, the system 10 includes a retrieval interface 72 for retrieving saved "looks." Preferably, the retrieval interface 72 includes a relatively small (e.g., thumbnail) image of one or more saved looks such that the user can conveniently and efficiently identify a desired look to load. Also, upon initial selection or highlighting of a saved look (e.g., by clicking once upon the associated thumbnail image), the retrieval interface 72 preferably displays written details regarding the products included in the look in a product detail portion 70. When a look is chosen from the retrieval interface 72, the system changes to the image simulation interface 33 and displays the chosen look, whereby the user can manipulate the look as previously described.

The ISI 33 also includes an email control 58 to send the current look information and/or current image to another as an attachment to an electronic mail message. The system 10 provides means to allow a recipient of such a message to load the image created by the sender (if supplied) or to apply the look to their base image 02.

When appropriate, the ISI 33 also includes controls to adjust the appearance of accessories displayed with the base image (not shown). For example, the ISI 33 preferably includes controls to adjust the scale and orientation of the image of the accessory. Further, the ISI 33 includes controls to clear 60 all product from the base image 02, and to print 56 the current image on a printer.

Further, the ISI 33 preferably includes an electronic "shopping cart" section including controls to add 46 and clear 48 products to and from the shopping cart, and a control to buy 50 products currently in the shopping cart.

Thus, the image simulation interface 33 provides a means for consumers to select various make-up and accessory products, visualize how those products will appear on themselves, and then purchase those products, all from one interface.

The Image Simulation Process

Figure 5:
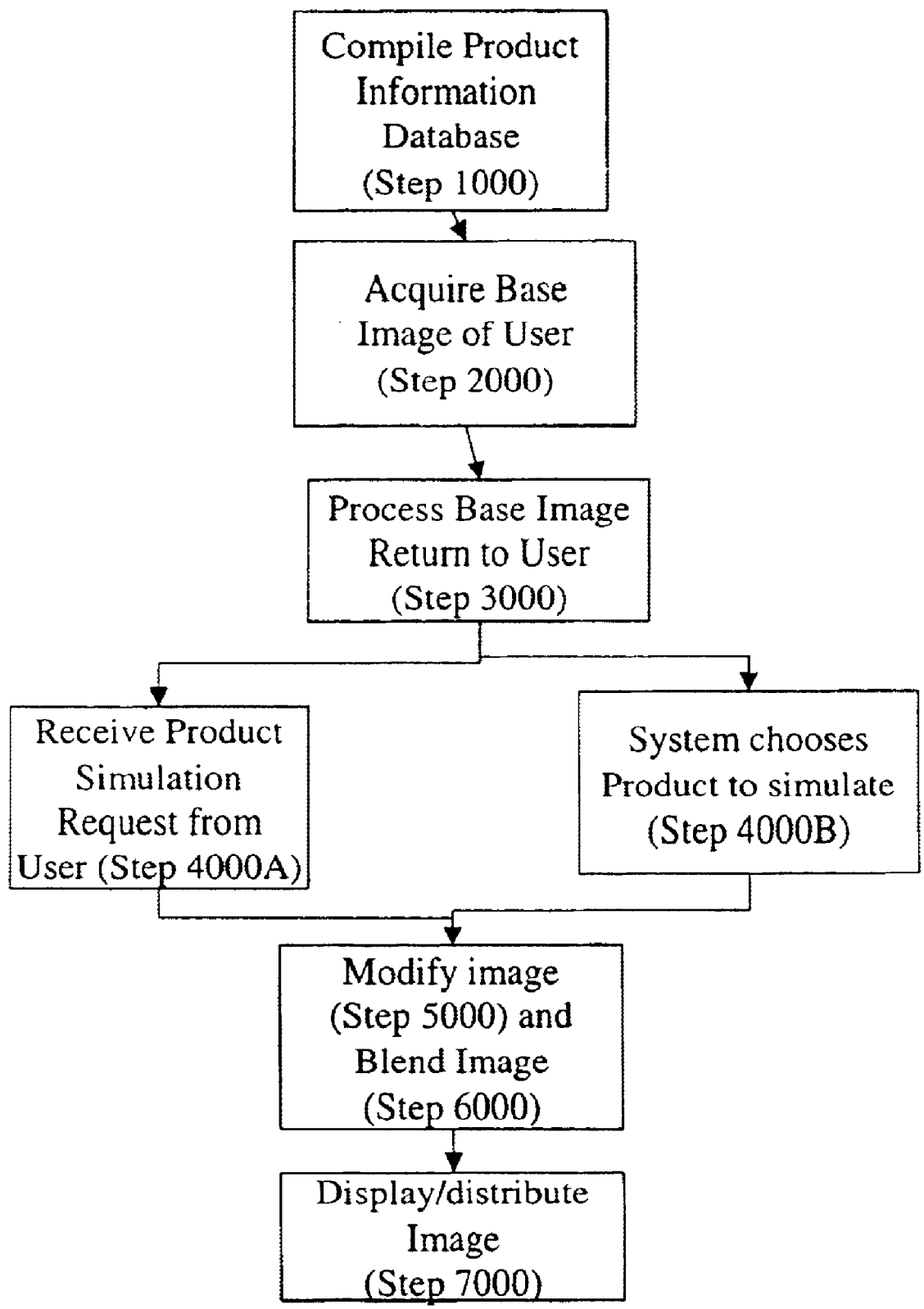
FIG. 5 is a process flow diagram of the method of the invention.

Referring to FIG. 5, an initial step 1000 of the method of the invention is compiling a database of information regarding a plurality of make-up and fashion accessory products. For make-up products, the database includes the product name, brand, category, subcategory cost, and a brief description of the product. The database also includes appearance information for make-up products, which information includes a three-bit RGB color representation and two 1 byte parameters for layer texture and light reflectivity (i.e., "glossiness"). For accessory products, the database includes the product name, category and cost, one or more digital images of each product, and an anchor point for each digital image.

The method also includes a step 2000 of acquiring a digital base image of a user. As stated above, this can be accomplished through any suitable digital image-capturing device or system, and can be made by imaging the user, or by digitally scanning a photograph of the user.

The base image is then processed 3000 to identify areas in which make-up and accessory products are to be applied. This processing is preferably performed at the location of the host system 12 and can be done by any suitable combination of manual and automated processing. Pixel information of the base image is preferably stored in a base image file, in bitmap RGB bands in, for example, a "tiff" format. The information regarding placement of make-up products on the base image, is also stored in the base image file along with the base image information, in separate "alpha channels", in the tiff file.

The first process in step 3000 is rotating and cropping the image of the face in the captured image. To accomplish this, the system (either manually or automatically) determines an image size factor and rotation factor according to the size and orientation of the head/face of the user within the captured image. Specifically, a pixel dimension of the head/face in the base is compared to a predefined standard dimension (either manually by sight or electronically) to determine the size factor. Also, a rotation factor is calculated by comparing an axis of the base image (e.g., the longitudinal axis of the face) with the vertical axis of the captured image (again, this can be performed manually or electronically). Using the image size and rotation factors, the captured image is then cropped and rotated to within a specified tolerance of a predetermined size and rotation.

Further, anchor points for locating accessory product images are defined by identifying (x,y) coordinates of associated pixels within the base image. For example: a point midway between the pupils can be identified as an anchor point for eye wear; points adjacent each ear lobe can be identified as an anchor points for earrings; and the two points where a necklace would disappear (as it passes around the neck) can be identified as a anchor points for necklaces. Further, for eyewear, the system calculates a rotation angle between a line connecting the pupils and the axis of the base image. A size factor for eyewear is determined by comparing a distance between the pupils with a predetermined distance (either manually or electronically). The anchor points, along with the size and rotation factors for eyewear are recorded within the base image file, preferably in a header portion thereof.

For each base image, one or more make-up application areas are defined for each make-up product type and are assigned a separate alpha channel within the base image file. Each alpha channel is a pixel-by-pixel map representing where and how much of an associated make-up product should be placed within the base image. Preferably, the alpha values in the alpha channels range in scale from an upper limit (e.g., 255) to a lower limit (e.g., 0). An alpha value equal to the lower limit (0) indicates that the color of the associated make-up product should be applied to the associated pixel in the base image, without modification (i.e., without blending). An alpha value equal to the upper limit (255) indicates that the color of the make-up associated make-up product should not be applied to the associated pixel in the base image.

The make-up application areas have blending regions wherein the alpha values range between the upper and lower limits (0<Alpha<255) indicating that the color of the associated make-up product should be blended, according to the alpha value, with the color of the associated pixel of the base image.

Referring to FIGS. 12–18, for explanatory purposes, the alpha values for various make-up application areas are depicted in gray-scale images reflecting the alpha values for associated pixels in the base image. In the representation employed in FIGS. 12–18, a darker shade of gray indicates a low alpha value, which results in a greater weighting given to the color of the make-up product during the blending process. Conversely, a lighter shade of gray indicates a high alpha value, which results in a lesser weighting given to the color of the make-up product.

Figure 12:
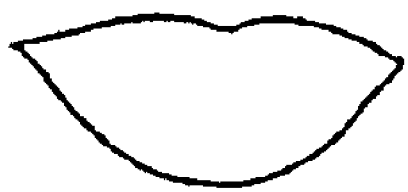
Figure 13:
Figure 16:

FIG. 12 displays alpha values suitable for blending lip liner products, on the periphery of the lips. FIG. 13 displays alpha values suitable for blending lipstick products on the lips. FIG. 14, displays alpha values suitable for blending blush products on the cheeks. FIG. 15 displays alpha values suitable for blending eyeliner products on the upper eyelid. FIG. 16 displays alpha values suitable for blending eyeliner products on the lower eyelid. FIG. 17 displays alpha values suitable for blending eye shadow on a lower portion of the upper eyelid. And, FIG. 18 displays alpha values suitable for blending eye shadow on an upper portion of the upper eyelid.

At the end of the processing line, the data size of the base image file is preferably reduced. Specifically, the three bands of the image are compressed and the alpha channels are encoded in a unique format with which the color applying engine works.

The base image file, containing the information obtained during processing, can be stored on the host system 12 and transmitted to the client system 14, 16 as needed (at session startup for instance). Alternatively, if the client system 14, 16 includes a storage device, the base image file can be transferred to the client system 14, 16 in any suitable manner—for example by transmitting the base image file over the network 19, or by recording the base image file on a portable storage medium and sending the medium to the user through the mail and then recording the file on the user system. For Internet based implementations, the user can download the processed base image from the host 12 over the network 19, or can receive the base image via electronic mail.

Referring again to FIG. 5, in step 4000A, the user selects a product from the database 20 using the image simulation interface (ISI) 33, as described above. In response to the user's selection, the host system 12 sends the product information stored in the database 20 to the client system 14, 16. To simulate the appearance of the selected product on the base image of the user, the color information of the selected product is modified and blended according to the color information of the base image, in steps 5000 and 6000, to create a composite image.

In the modification step 5000, the appearance information of the base image (or at least the appearance information of the associated make-up application area) is modified, simulating the physical process of color application, to create the appearance that the make up region has been fully covered with the color of the product, and was photographed at the same illumination and shading as the base image. This is achieved by using the intensities of the make-up area of base image (as a black and white image) to which the product color is applied.

First, the image is converted from the Red-Green-Blue (RGB) format to a Hue-Saturation-Intensity (HSI) format. Then, the intensity image undergoes a contrast stretching (or "equalization") procedure in which the intensity values (I) of the pixels in the make-up application area are adjusted according to a predetermined equalization algorithm. The arguments of the equalization algorithm are: (1) the difference in intensity between the applied color and mean intensity of the pixels of the make-up area, and (2) the variance of the intensities of the pixels of the make-up area. The hue and saturation values (H,S) of the pixels in the make-up application area are set equal to the hue and saturation values of the selected make-up product. This process preserves details, highlights and shadows present in the original base image.

Figure 19:
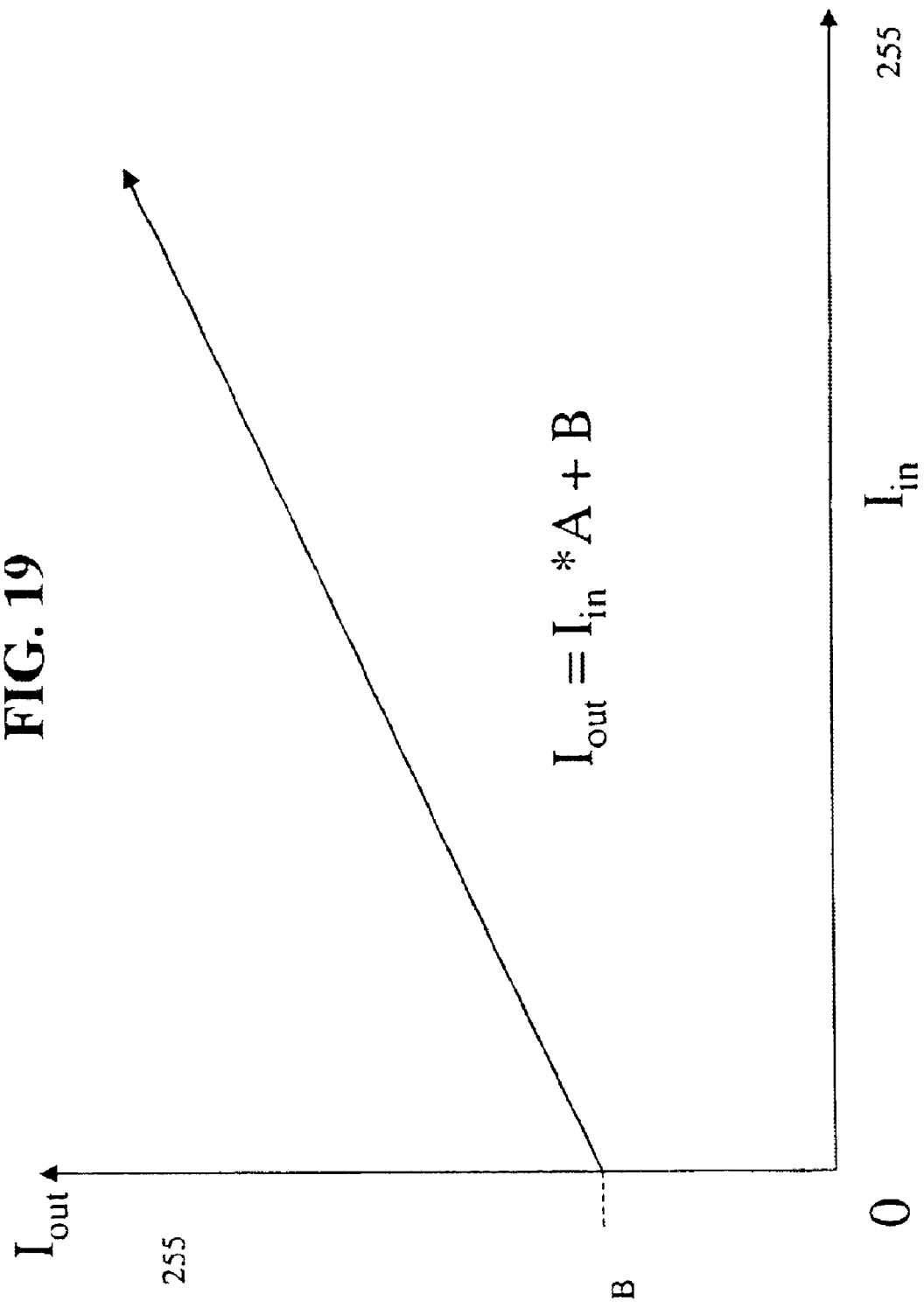
FIG. 19 is a graph of the equalization function of the present invention.
Figure 20:
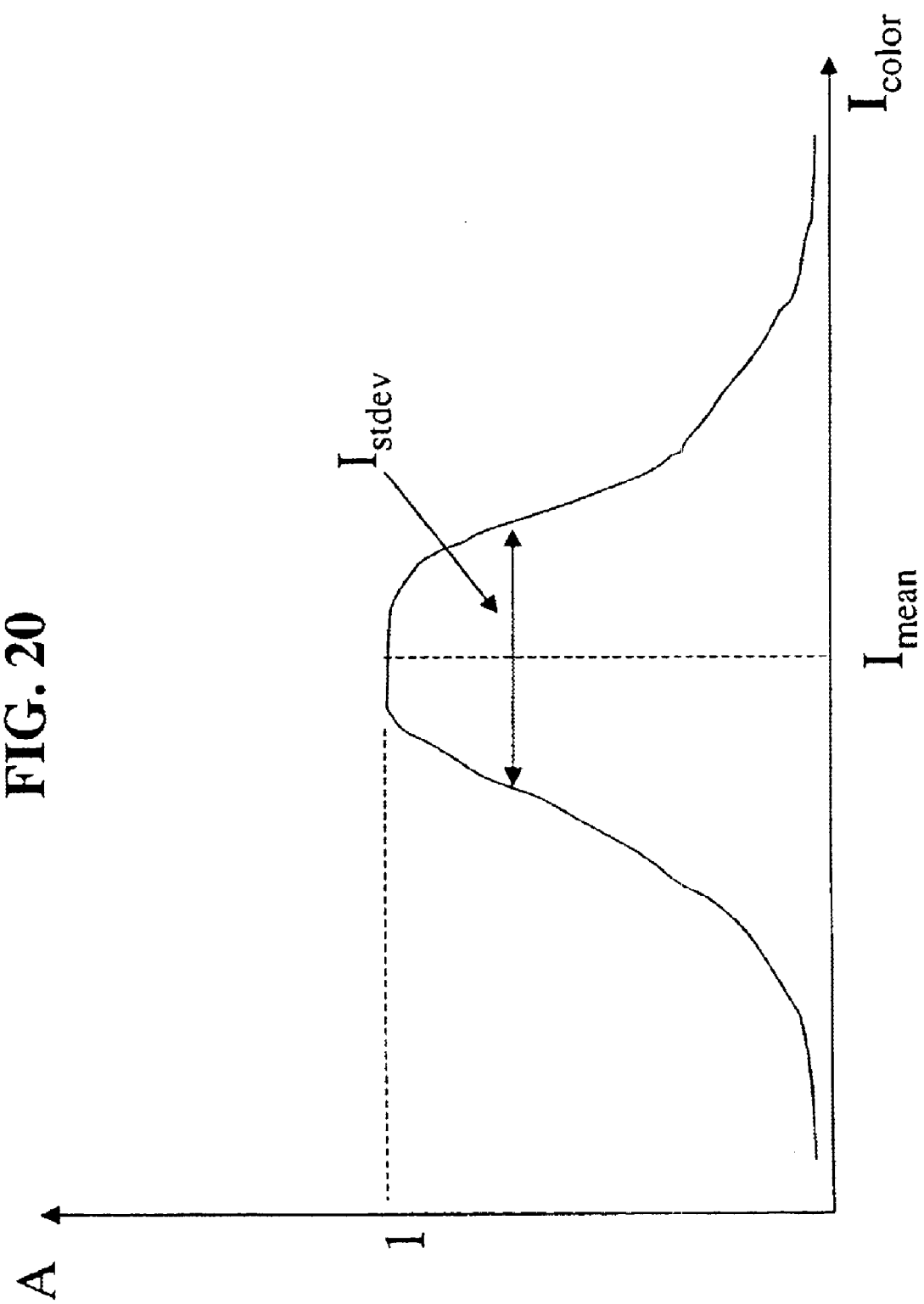
FIG. 20 is a graph of the distribution of the slope A of the equalization algorithm as a function of the intensity of the product color.

Referring to FIGS. 19 and 20, the algorithm for equalizing the intensity values of make-up application area is a linear function whose parameters are computed from the statistics of the base image make-up application area and the intensity of the product color, as follows:

$$I_{out} = A*I_{in} + B \quad [1]$$

Where;

$I_{out}$ is the value of the intensity of a pixel of the equalized area, $I_{out}$ can range between Upper and Lower Limits of 255 and 0, respectively, $I_{in}$ is the value of the intensity of an associated pixel of the make-up application area of the base image (before equalization), $I_{in}$ can range between the Upper and Lower Limits, A is the slope of the function and is computed according to a gaussian distribution function, as follows:

$$A = \exp(-0.5*(I_{color}-I_{mean})^2/I_{stdev}^2) \quad [2]$$

Where, $I_{color}$ is the value of the intensity of the applied product color, $I_{mean}$ is the mean value of the intensities of the pixels in the make-up application area, and $I_{stdev}$ is the variance of the intensities of the pixels in the make-up application area, B is a constant computed by equating the $I_{in}$ and $I_{out}$ values in the equalization function [1] to $I_{mean}$ and $I_{color}$, respectively According the above formula, pixels in the make-up application area of the base image having intensity values equal to the mean intensity value of the make-up application area will be assigned an intensity value exactly equal to the intensity value of the product color. Pixels of the make-up application area of the base image having intensity values other than the mean intensity value will be assigned intensity values spread around the intensity value of the product color according to the variance in intensity of the make-up application area of the base image.

For extreme differences in intensity value between the applied product color and the mean intensity of the pixels of the make-up application area of the base image, the slope A of the equalization function is modified according to the following:

For $I_{color}-I_{mean} > 2*I_{stdev}$, $I_{mean}$ is replaced by $I_{mean}*0.4 + I_{color}*0.06$ For $I_{color}-I_{mean} < -2*I_{stdev}$, $I_{mean}$ is replaced by $1.2*I_{mean}$ The equalization function can be represented in one or more look-up tables stored on the client system and/or the host system, as appropriate.

After applying the intensity equalization function and changing the hue and saturation to the associated values of the applied color in the make-up application area, next, the H,S,I values of the pixels in the make-up application area are re-converted back into the RGB format, by a re-conversion procedure, using an inverse of the transformation described above.

In a blending step 6000, the pixels of the blending region of the make-up application area, which by definition have alpha values between the upper (255) and lower (0) limits, are blended with the associated pixels in the original base image to form the fully colored base image. An offset value (constant to all pixels in the make-up application area) is also introduced which governs the "amount" of applied color relative to the amount of original color in final image. This offset value is controlled from the "Heavier"/"Lighter" color application controls on the image simulation interface (ISI).

Specifically, the red, green and blue color values (Rc, Gc, Bc) of the pixels of the blending region of the make-up application area are determined by the following formulae:

$$Rc = [Rb*Alpha + Rp*(Alpha-UpperLimit)]/UpperLimit$$

$$Gc = [Gb*Alpha + Gp*(Alpha-UpperLimit)]/UpperLimit$$

$$Bc = [Bb*Alpha + Bp*(Alpha-UpperLimit)]/UpperLimit$$

Where:

Rb, Gb, Bb are respectively the red, green and blue color values of the associated pixels in the original base image;

Rp, Gp, Bp are respectively the red, green and blue color values of the associated pixels in the blending region of the modified make-up application area;

Alpha is the Alpha value of the associated pixel in the blending region of the make-up application area minus the alpha offset value obtained from the "heavier"/ "lighter" controls; and UpperLimit is the predefined upper limit of the Alpha values.

Upon completion of the modification and blending steps 5000, 6000, the composite image is displayed 7000A in the image simulation interface (ISI) 33. It should be noted that the calculations of the above modification and blending steps could be made by the user system 14, 16, by the host system 12, or by any combination thereof.

The combination of defining accurate make-up application areas and blending regions (in the processing step), preserving details, highlights and shadows (in the modification step), and blending colors from the base image in the blending region of the make-up application area (in the blending step) achieves a very high, and heretofore unavailable level of realism for simulating make-up application.

As described above, the user can adjust the "amount" of make-up applied by the system to the base image. The ISI 33 includes application controls 45 to increase or decrease the amount of make-up applied to the base image. These controls effectively adjust the offset to the alpha values of the pixels of the blending region to affect the respective weights given to the colors of the pixels of the original base image and of the pixels of the blending region of the modified make-up application area.

When the user directs the system to lighten the application of make-up (compare FIGS. 10 and 11), the alpha values for the blending region of the make-up application area are increased by a predetermined amount to increase the weight given to the colors of the pixels of the original base image. Then, the blending step 6000 is repeated to recalculate the blended colors to create an adjusted composite image, and the adjusted composite image is re-displayed in the ISI 33.

Conversely, when the user directs the system to increase the application of make-up, the alpha values for the blending region of the make-up application area are decreased by a predetermined amount to decrease the weight given to the colors of the pixels of the original base image. FIG. 10 shows a make-up product applied in a standard or default amount. FIG. 11 shows the same make-up product applied in a lighter amount. Preferably, the system imposes a limit upon how much the user can increase the application of a given make-up product so as to avoid undesirable results. For example, the system can limit the increase in application by between about 40% and 100% of the standard or default amount.

Make-up products are often applied in completely or partially overlapping layers. For example, blush is often applied over a foundation, and different shades of eye shadow make-up are commonly applied in overlapping layers. Depending on the amount of application and color of the overlying product, the underlying product will often affect the appearance of the overlying product. Therefore, in rendering images, which include such overlapping make-up products, the system blends the colors of the products together in the region in which they overlap.

To render the image of overlapping make-up products, the system computes the composite image in iterative, sequential steps. First, the system computes the composite image with the underlying make-up product, in the manner set forth above (i.e., modifying and blending with the original base image). Then, the system applies the overlying product in the same manner using the first composite image as the "base" image. The system applies overlapping make-up products in a predetermined order, generally recognized as the proper order of application.

Referring to FIG. 3, the ISI 33 includes controls 47, 48 to apply eye shadow to either a primary area or a secondary area, which overlap, as can be seen from the graphic representations of the areas adjacent the controls. Preferably the controls 47, 48 function similarly to so-called "radio buttons", and are mutually exclusive, whereby turning one "on" turns the other "off."

Fashion Accessory Products

To render composite images of accessory products with the base image, the system aligns the anchor point of the image of the accessory product (which can be the first pixel in the image or any other predefined pixel) with the associated anchor point coordinate contained in the base image file (described above). The system adjusts the size of the image of the accessory product according to the size factor contained in the base image file. Further, the system adjusts the orientation (angle) of the accessory image according to the rotation factor(s) contained in the base image file.

Figure 21:
FIG. 21-25 are composite images of various fashion accessories superimposed over the base image.
Figure 22:

FIGS. 21 and 22 display accessory products rendered with the base image. Specifically, FIG. 21 shows drop earring accessory products correctly aligned so as to appear to be hanging from the ear lobes of the consumer's image. As can be appreciated, the orientation of each earring is adjusted to appear realistic. Specifically, each earring accessory products have been separately rotated around a y-axis so as to appear to hang naturally. FIG. 22 shows a hat superimposed over the base image.

Figure 23:

Referring to FIG. 23, the product image may include transparent areas (e.g., the center area of an image of a loop earring, or the area surrounding the product in the image) in which the base image will appear unmodified. The product image may also include semi-transparent areas (e.g. tinted lenses of eye wear as shown in FIG. 23) in which the product image is blended with the base image. Thus, after alignment, size adjustment and orientation of the accessory product image, the system blends the product image with the base image using the alpha values of the pixels of the product image In a processing step similar to that described above for make-up application, the semi-transparent areas of the product image are assigned alpha values between the upper and lower limits (255,0), thus creating blending regions in the product image. As stated above, the alpha values are preferably contained in alpha channels in the product image file.

In a blending step similar to that described above, the color information of the pixels in the blending regions is blended with the color information of the pixels of the base image, using the blending algorithms set forth above. Upon completion of the blending step, the composite image including the blended product image is displayed in the ISI 33.

To render images of hair products, the system employs image processing, modification and rendering steps similar to those described above. Specifically a hair product application area is defined, with associated alpha values and the color of the hair in the base image is changed using the modification and blending steps as above. As above, the system preferably allows the user to adjust the color effect of the hair product. The information regarding applied hair products can be saved in (and loaded from) the product information "look" file, as described above.

Figure 24:
Figure 25:

Referring to FIGS. 24 and 25, to render images of nail products, the system preferably uses a "stock" image of a hand (FIG. 24), from for example a hand model, and similar steps are used to simulate nail products (e.g., nail polish) applied to the nails of the image. Thus, nail product application areas are defined (i.e., the nail areas), with associated alpha values (if necessary), and the color of the nails in the image is changed using the modification and blending steps as above (FIG. 25). As above, the nail product information can be saved in a product information file The Marketing Methods of the Invention The marketing method of the invention provides new and powerful tools for promoting cosmetic and fashion products, most suitably via the Internet. Manufacturers and retailers can use the technology of the invention to suggest and promote various products using a realistic simulation of make-up and accessory products superimposed and blended with the customer's own image. In addition, retailers and manufacturers can direct their marketing efforts to a focused by tailoring the suggestions and promotions based on previous consumer behaviors.

In one marketing method of the invention, the system 10, selects one or (preferably) more make-up, hair, nail and/or accessory products, or other products from the database 20. This selection can be made at the request of a third party (e.g., a manufacturer of the products) without direct input from the consumer. The system then creates either a fully rendered composite image of the consumer with the selected products, using the consumer's own image as the base image (previously captured and processed), or merely creates a "look" information file containing the selected product information. Next, the system sends the fully rendered composite image, or the look information file to the consumer.

The fully rendered composite image or the look information file can be delivered to the consumer in any suitable manner including electronically (e.g., via electronic mail), in a photograph, or on a computer-readable medium (e.g., on a CD). In addition, samples of the products shown in the composite image or file can be delivered to the consumer simultaneously.

If the composite image or look information file is delivered to the consumer electronically, or in a computer-readable format, the consumer can use the client system 14, 16 to load the image or file through the retrieval interface, and can view the resulting image through the ISI 33.

In another marketing method of the invention, "look codes" are posted or published, for example in traditional advertisements (e.g. print, television or radio ads) or electronic advertisements (e.g., banner ads in web pages), which codes are associated in the system with predetermined make-up and/or accessory products, and particular applications of such products (i.e., various make-up "looks"). Preferably such codes appear in advertisements of manufacturers, which advertisements depict or describe make-up products applied to models, and the codes are aligned near (or otherwise associated with) a brand name of the system (e.g., EZFace). Upon access to the system, the consumer enters the "look code", which directs the client and/or host system to display the products over the (previously captured and processed) base image of the consumer, as described above, so that the customers can see for themselves how the products will look on themselves. This method enables manufacturers to efficiently demonstrate their products to customers in a discrete and personalized manner.

In another marketing method of the invention, Internet web pages are provided with electronic links (i.e. hypertext links), which when clicked upon, cause the client system to display the consumer's image with a predetermined application of make-up products and/or accessories. The links can be take any suitable form (i.e., text links or image links). Preferably, the links are aligned adjacent to or otherwise associated with images of models wearing the make-up applications, or associated with make-up or accessory products.

If the user interfaces of the system are implemented through a standard browser, such as with a "plug-in" or script, then the link can include a network address of the host system 12 (i.e., the url) and an embedded look code which is received by the host system 12 upon clicking upon the link. Upon login to the system, the system then uses the embedded look code to retrieve the look information from the product database, and then displays the products on the image of the consumer, as described above.

If the user interfaces are implemented through a separate client application, the client system can include a listening program running in the background which monitors when a hypertext link is clicked upon. The listening program retrieves the embedded look code, launches the client application (if required), and passes the look code to the client application, which then contacts the product database (through the network and host) to retrieve the product information, and to display the composite image.

Further, the system can record a consumer's buying and "trying" habits in a consumer history database located on the host system 12, which can then be used to target personalized product marketing to the consumer, or to conduct highly accurate market studies about consumer preferences.

It can be appreciated that the marketing method of the invention provides a powerful and persuasive marketing tool because the user can see the products as applied to their own image, and, through the system can easily and conveniently purchase the products.

Multi-User Sessions

In addition, the system 10 provides means whereby two or more users can manipulate a single base image simultaneously. This provides a powerful tool whereby friends or students can try different make-up applications together or with other persons, in an effective and entertaining manner.

In this method, a first client system 14 and a second client system 16 are interconnected via the host system 12, through the network 19. The initial interface 30 of the system 10 preferably includes a link, labeled for example "Shop with a Friend", which when selected preferably provides means for each user to select another user or group. When this feature is enabled, the ISI 33 of each user displays an identical base image, which can be the base image for one of the users, or another person. Modifications made at one client system 14 are monitored by (transmitted to) the host system 12, and then transmitted to the other client system 16, where the modifications are made or displayed on the ISI 33 of the receiving client system, in accordance with the methods described above.

The multi-user feature can also be used to provide personalized, one-on-one training or consulting services to consumers. In this manner, the client system of the user is connected, through the host, to a client system of a professional consultant, who can guide the consumer in selecting products. The consumer and consultant will each have the base image of the consumer on their client systems. Using the base image of the consumer, the consultant can show the consumer a recommended selection of products and their proper application.

Optionally, the system 10 prohibits one of the users from making modifications to the base image. Similarly, if a multiplicity of users are similarly interconnected through the system (e.g., in a group or class), the system prohibits all but one of the users (e.g., the instructor) from making modifications. The information flow and routing of information over the network 19 during multiple-user sessions can be managed by the host system 12 or a dedicated system for such function, which can monitor user requests and can log pre-scheduled dates for "net meetings."

It should be understood, of course, that the specific form of the invention herein illustrated and described is intended to be representative only, as certain changes may be made therein without departing from the clear teachings of the disclosure.

What is claimed:

1. A method for simulating an appearance of products on an image of a consumer, comprising:

compiling a database of a plurality of products, said database including appearance information for each said product;

acquiring a base image of a consumer, said base image including a plurality of pixels;

identifying a product application area in said base image, said product application area including a blending region, said product application area and said blending region thereof being defined by sets of pixels of said base image;

receiving a product selection from said consumer;

retrieving appearance information associated with said selected product from said database;

modifying appearance information of base image pixels of said product application area according to said appearance information of said selected product, thereby generating a modified image, comprising:

assigning hue and saturation appearance values of pixels of said product application area equal to hue and saturation appearance values of said selected product, respectively; and assigning intensity appearance values of pixels of said product application area according to intensity appearance values of a plurality of base image pixels within said product application area and according to intensity appearance values of a plurality of base image pixels outside said product application area, employing the following function, $$I_{out}=A*I_{in}+B,$$

where:

$I_{out}$ is the value of the intensity of a pixel of the modified image;

$I_{out}$ can range between upper and lower limits of 255 and 0, respectively;

$I_{in}$ is the value of the intensity of an associated pixel of the base image;

$I_{in}$ can range between the upper and lower limits;

A is the slope of the function and is computed according to a Gaussian distribution function, as follows, $$A=\exp(-0.5*(I_{color}-I_{mean})^2/I_{stdev}^2),$$

where:

$I_{color}$ is the value of the intensity of the selected product appearance information;

$I_{mean}$ is a mean value of the intensities of the pixels in the product application area; and $I_{stdev}$ is a standard deviation of the intensities of the pixels in the product application area; and B is a constant computed by equating the $I_{in}$ and $I_{out}$ values to $I_{mean}$ and $I_{color}$, respectively;

blending said modified image with said base image by assigning appearance information of pixels of said blending region according to appearance information of pixels of said modified image and according to appearance information of associated pixels of said base image, thereby generating a composite image;

displaying the composite image; and providing means to display an alternative product within said product application area.

2. A method for simulating an appearance of products on an image of a consumer, comprising:

compiling a database of a plurality of products, said database including appearance information for each said product;

acquiring a base image of a consumer, said base image including a plurality of pixels;

identifying a product application area in said base image, said product application area including a blending region, said product application area and said blending region thereof being defined by sets of pixels of said base image;

receiving a product selection from said consumer;

retrieving appearance information associated with said selected product from said database;

modifying appearance information of base image pixels of said product application area according to said appearance information of said selected product, thereby generating a modified image, comprising:

assigning hue and saturation appearance values of pixels of said product application area equal to hue and saturation appearance values of said selected product; and assigning intensity appearance values of pixels of said product application area according to intensity appearance values of substantially all of said base image pixels;

blending said modified image with said base image by assigning appearance information of pixels of said blending region according to appearance information of pixels of said modified image and according to appearance information of associated pixels of said base image, thereby generating a composite image;

displaying the composite image; and providing means to display an alternative product within said product application area.

3. A method or simulating an appearance of products on an image of a consumer, as in claim 2, wherein said step of assigning intensity appearance values of pixels of said product application area further comprises employing the following function, $$I_{out}=A*I_{in}+B,$$

where:

$I_{out}$ is the value of the intensity of a pixel of the modified image;

$I_{out}$ can range between upper and lower limits of 255 and 0, respectively;

$I_{in}$ is the value of the intensity of an associated pixel of the base image;

$I_{in}$ can range between the upper and lower limits;

A is the slope of the function and is computed according to a Gaussian distribution function, as follows, $$A=\exp(-0.5*(I_{color}-I_{mean})^2/I_{stdev}^2),$$

where:

$I_{color}$ is the value of the intensity of the selected product appearance information;

$I_{mean}$ is a mean value of the intensities of the base image pixels in the product application area; and $I_{stdev}$ is standard deviation of the intensities of the base image pixels in the product application area; and B is a constant computed by equating the $I_{in}$ and $I_{out}$ values to $I_{mean}$ and $I_{color}$, respectively.

4. A method for simulating an appearance of products on an image of a consumer, comprising:

compiling a database of a plurality of products, said database including appearance information for each said product;

acquiring a base image of a consumer, said base image including a plurality of pixels;

identifying a product application area in said base image, said product application area including a blending region, said product application area and said blending region thereof being defined by sets of pixels of said base image;

assigning alpha channel values to each pixel of said set of pixels of said product application area;

receiving a product selection from said consumer;

retrieving appearance information associated with said selected product from said database;

modifying appearance information of base image pixels of said product application area according to said appearance information of said selected product, thereby generating a modified image, comprising assigning hue and saturation appearance values of pixels of said product application area substantially equal to hue and saturation appearance values of said selected product;

assigning intensity appearance values of pixels of said product application area according to intensity appearance values of a plurality of base image pixels within said product application area and according to intensity appearance values of substantially all of said base image pixels;

said intensity appearance values are assigned according to a predetermined algorithm, comprising employing the following function, $$I_{out} = A * I_{in} + B,$$

where:

$I_{out}$ is the value of the intensity of a pixel of the modified image;

$I_{out}$ can range between upper and lower limits of 255 and 0, respectively;

$I_{in}$ is the value of the intensity of an associated pixel of the base image;

$I_{in}$ can range between the upper and lower limits;

A is the slope of the function and is computed according to a Gaussian distribution function, as follows, $$A = \exp(-0.5 * (I_{color} - I_{mean})^2 / I_{stdev}^2),$$

where:

$I_{color}$ is the value of the intensity of the selected product appearance information;

$I_{mean}$ is a mean value of the intensities of the base image pixels in the product application area; and $I_{stdev}$ is a standard deviation of the intensities of the base image pixels in the product application area; and B is a constant computed by equating the $I_{in}$ and $I_{out}$ values to $I_{mean}$ and $I_{color}$, respectively;

blending said modified image with said base image by assigning appearance information of pixels of said blending region according to said alpha values, thereby generating a composite image, wherein:

a red color value (Rc), a green color value (Gc) and a blue color value (Bc) of said pixels of said product application area in said composite image being determined by the following respective formulae, $$Rc = [Rb * Alpha + Rp * (UpperLimit - Alpha)] / UpperLimit,$$

$$Gc = [Gb * Alpha + Gp * (UpperLimit - Alpha)] / UpperLimit,$$

$$Bc = [Bb * Alpha + Bp * (UpperLimit - Alpha)] / UpperLimit,$$

where:

Rb, Gb and Bb are respective red, green and blue color values of a pixel in said base image;

Rp, Gp and Bp are respective red, green and blue color values of an associated pixel in said modified image;

Alpha is an alpha value of an associated pixel in said product application area; and UpperLimit is a predefined upper limit of values;

displaying the composite image; and providing means to display an alternative product within said product application area.

5. A method of marketing aesthetic products, comprising:

compiling a database of a plurality of aesthetic products, said database including appearance information for each said aesthetic product;

acquiring a base image of a consumer, said base image including a plurality of pixels;

identifying a product application area in said base image, said product application area including a blending region, said product application area and said blending region thereof being defined by sets of pixels of said base image;

selecting a product selection from said database;

retrieving appearance information associated with said selected product from said database;

modifying appearance information of base image pixels of said product application area according to said appearance information of said selected product, thereby generating a modified image, comprising:

assigning hue and saturation appearance values of pixels of said product application area equal to hue and saturation appearance values of said selected product; and assigning intensity appearance values of pixels of said product application area according to intensity appearance values of a plurality of base image pixels within said product application area and according to intensity appearance values of a plurality of base image pixels outside said product application area, employing the following function, $$I_{out} = A * I_{in} + B,$$

where:

$I_{out}$ is the value of the intensity of a pixel of the modified image;

$I_{out}$ can range between upper and lower limits of 255 and 0, respectively;

$I_{in}$ is the value of the intensity of an associated pixel image;

$I_{in}$ can range between the upper and lower limits;

A is the slope of the function and is computed according to a Gaussian distribution function, as follows, $$A = \exp(-0.5 * (I_{color} - I_{mean})^2 / I_{stdev}^2),$$

where:
- $I_{color}$ is the value of the intensity of the selected product appearance information;
- $I_{mean}$ is a mean value of the intensities of the base image pixels in the product application area; and
- $I_{stdev}$ is a standard deviation of the intensities of the base image pixels in the product application area; and
- B is a constant computed by equating the $I_{in}$ and $I_{out}$ values to $I_{mean}$ and $I_{color}$, respectively;

blending said modified image with said base image by assigning appearance information of pixels of said blending region according to appearance information of pixels of said modified image and according to appearance information of associated pixels of said base image, thereby generating a composite image; and distributing, to said consumer, the composite image.

6. A method of marketing aesthetic products, comprising:

compiling a database of a plurality of aesthetic products, said database including appearance information for each said aesthetic product;

acquiring a base image of a consumer, said base image including a plurality of pixels;

identifying a product application area in said base image, said product application area including a blending region, said product application area and said blending region thereof being defined by sets of pixels of said base image;

selecting a product selection from said database;

retrieving appearance information associated with said selected product from said database;

modifying appearance information of base image pixels of said product application area according to said appearance information of said selected product, thereby generating a modified image, comprising:
- assigning hue and saturation appearance values of pixels of said product application area equal to hue and saturation appearance values of said selected product; and
- assigning intensity appearance values of pixels of said product application area according to intensity appearance values of substantially all of said base image pixels;

blending said modified image with said base image by assigning appearance information of pixels of said blending region according to appearance information of pixels of said modified image and according to appearance information of associated pixels of said base image, thereby generating a composite image; and distributing, to said consumer, the composite image.

7. A method of marketing aesthetic products, as in claim 6, wherein said step of assigning intensity appearance values of said pixels of said product application area further comprises employing the following formula:

$$I_{out} = A*I_{in} + B,$$

where:
- $I_{out}$ is the value of the intensity of a pixel of the modified image;
- $I_{out}$ can range between upper and lower limits of 255 and 0, respectively;
- $I_{in}$ is the value of the intensity of an associated pixel of the base image;
- $I_{in}$ can range between the upper and lower limits;
- A is the slope of the function and is computed according to a Gaussian distribution function, as follows, $$A = \exp(-0.5*(I_{color} - I_{mean})^2 / I_{stdev}^2),$$

where:
- $I_{color}$ is the value of the intensity of the selected product appearance information;
- $I_{mean}$ is a mean value of the intensities of the base image pixels in the product application area; and
- $I_{stdev}$ is a standard deviation of the intensities of the base image pixels in the product application area; and
- B is a constant computed by equating the $I_{in}$ and $I_{out}$ values to $I_{mean}$ and $I_{color}$, respectively.

* * * * *